May 7, 1935.  H. E. LIPPERT  2,000,469
LOCOMOTIVE FUEL CONVEYER
Filed May 5, 1934  3 Sheets-Sheet 1
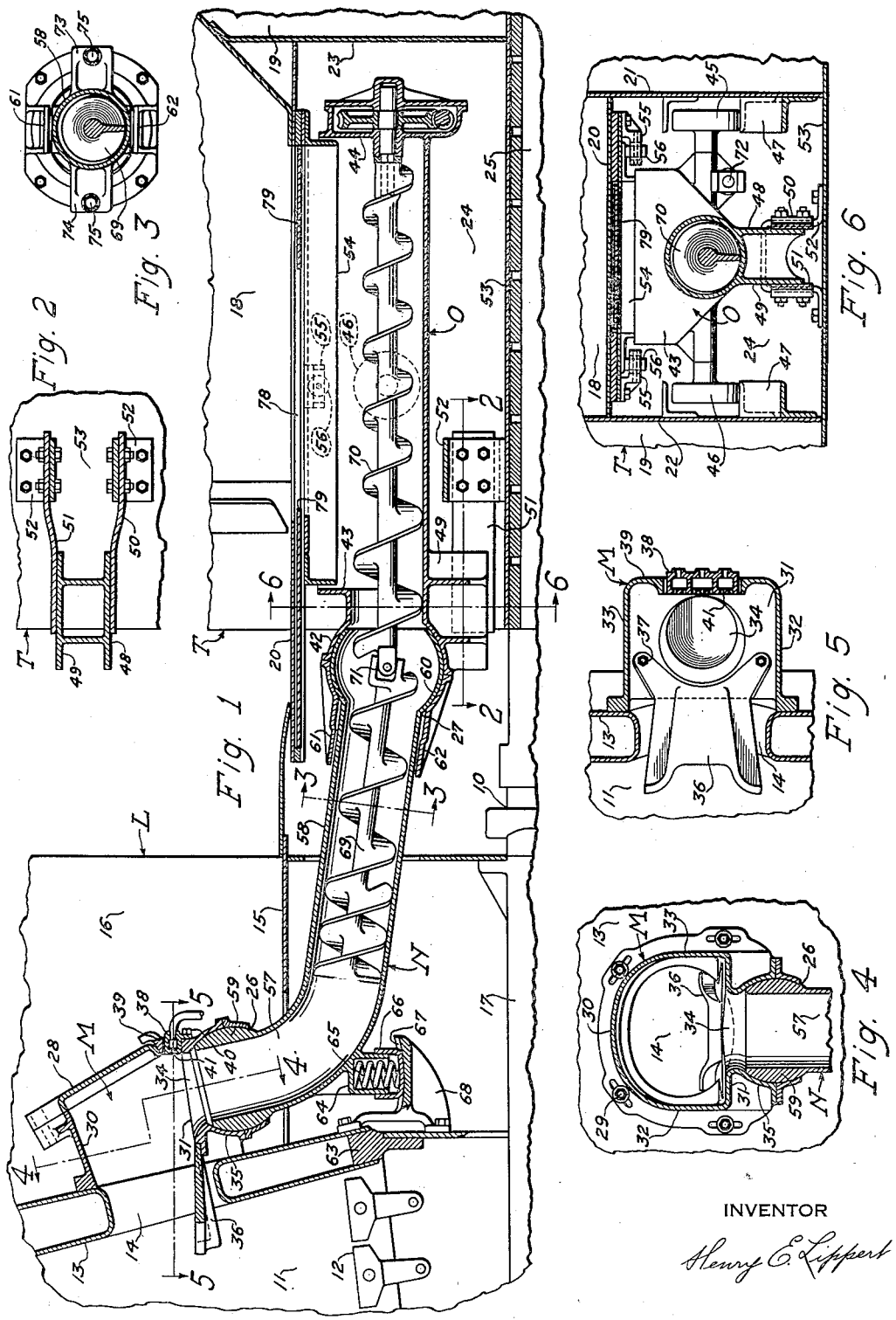
INVENTOR
Henry E. Lippert

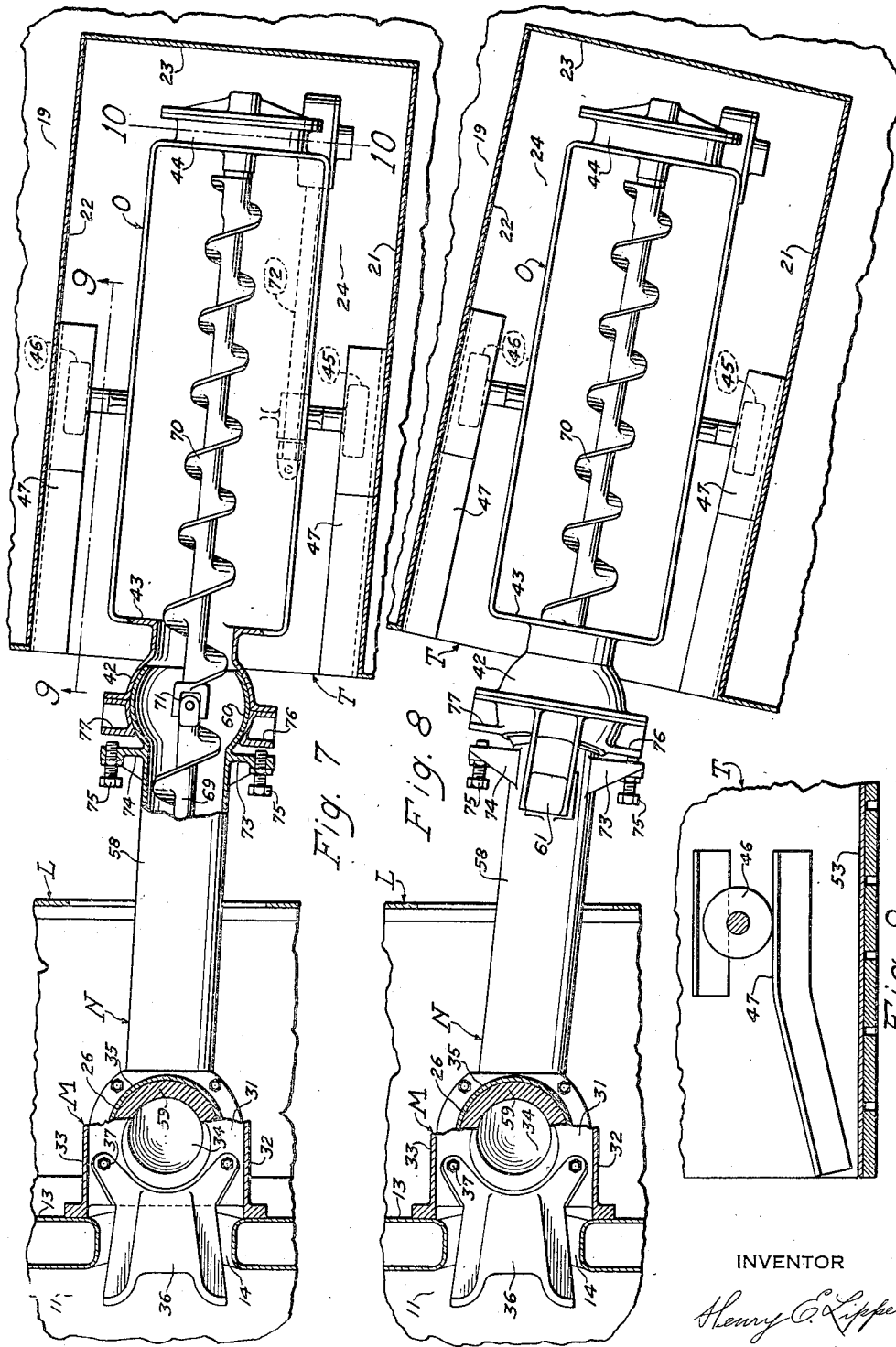

May 7, 1935.  H. E. LIPPERT  2,000,469
LOCOMOTIVE FUEL CONVEYER
Filed May 5, 1934   3 Sheets-Sheet 3
Fig. 11
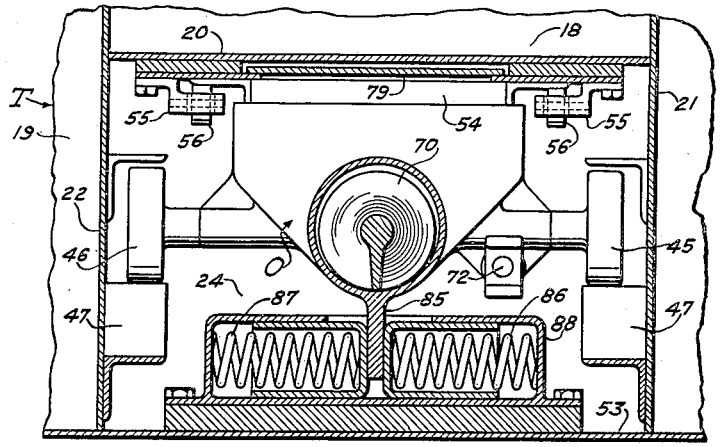
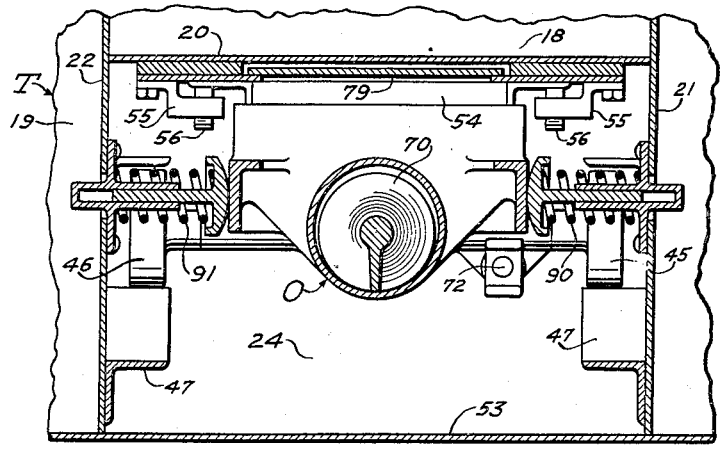
Fig. 12
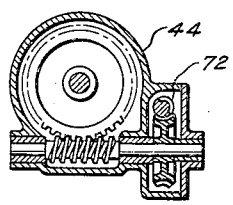
Fig. 10
INVENTOR
Henry E. Lippert Patented May 7, 1935

2,000,469

UNITED STATES PATENT OFFICE 2,000,469

LOCOMOTIVE FUEL CONVEYER

Henry E. Lippert, Pittsburgh, Pa.

Application May 5, 1934, Serial No. 724,140

20 Claims. (Cl. 198—15)

This invention relates to locomotive fuel conveyers or stokers having a plurality of conduit sections flexibly jointed together and a plurality of helical screws within the conduit system universally connected together at the joint between the conduit sections, and relates particularly to the arrangement and mounting of the conduit system upon intercoupled locomotives and tenders.

An object of this invention is to provide a fuel conveyer having a plurality of conduit sections flexibly jointed for angular movement with relation to one another, and arrange and mount the same upon an intercoupled locomotive and tender in a manner whereby each conduit section facilitates lateral displacement between the rear end of the locomotive and the forward end of the tender when the vehicles pass over curved tracks.

Another object is to provide a conduit system arrangement which not only can be installed on the larger classes of steam actuated locomotives, but is equally applicable to the smaller classes and will allow lateral movement of the tender with respect to the locomotive when the vehicles operate around sharp curves or curves of comparatively short radii, without imposing a severe angle on the universal joint connecting the helical screws in the fuel conveyer.

Another object of the invention is the provision of a fuel conveyer having a plurality of conduit sections flexibly jointed for angular movement with relation to one another mounted upon an intercoupled locomotive and tender so that one conduit section swings laterally alone when the vehicles travel around slight curves or pass over tracks of a degree of curvature within a predetermined range, and a plurality of conduit sections swing laterally together when the vehicles operate around sharp curves or negotiate tracks of a degree of curvature greater than the predetermined range.

The present invention has for another of its objects the provision of a fuel conveyer wherein the angular movement between helical screws universally jointed together and the angular movement between conduit sections flexibly connected together can be limited, or even predetermined, thus increasing the efficiency of the universal joint connecting the helical screws and the period of time it is useful for service.

A further object is to provide a fuel conveyer having a conduit section mounted to swing laterally in a compartment on the tender arranged upon an intercoupled tender and locomotive in such a manner that the conduit section on the tender swings laterally to facilitate only a portion of the lateral displacement between the vehicles when they operate around sharp curves. Such a structure permits the provision of a compartment of comparatively narrow width to receive the conduit section on the tender. This compartment occupies a part of the tender which otherwise would be used as space for storing water, and a compartment narrow in width allows more storage space for water. This feature of the invention is particularly beneficial when an unusually long conduit section is arranged to swing laterally in the tender, since an undesirably large volume of water space need not be sacrificed.

Other objects and advantages of the invention will appear from a reading of the following description, taken in connection with the accompanying drawings, forming a part hereof, in which:

Fig. 1 is a longitudinal vertical central section of the rear portion of a locomotive, the forward portion of a tender and the improved conveyer, showing the conveyer applied to the tender and locomotive.

Fig. 2 is a horizontal sectional view taken on line 2—2 of Fig. 1.

Fig. 3 is a transverse section taken on line 3—3 of Fig. 1.

Fig. 4 is a transverse sectional view taken on line 4—4 of Fig. 1.

Fig. 5 is a horizontal section taken on line 5—5 of Fig. 1.

Fig. 6 is a transverse vertical section taken on line 6—6 of Fig. 1.

Fig. 7 is a sectional view of the rear portion of the locomotive taken on a horizontal plane through the firing opening and of the forward portion of the tender taken on a horizontal plane through the compartment for receiving the conveyer, showing the conveyer with parts broken away mounted upon the locomotive and tender. This view illustrates the position of the locomotive, the tender and the conveyer conduit sections with relation to one another when the vehicles negotiate tracks of a degree of curvature within a predetermined range.

Fig. 8 is a view similar to Fig. 7, and shows the position of the tender, the locomotive and the conveyer conduit sections with relation to one another when the vehicles operate around tracks of a degree of curvature greater than a predetermined range.

Fig. 9 is a vertical longitudinal section taken on line 9—9 of Fig. 7.

Fig. 10 is a transverse vertical section taken on line 10—10 of Fig. 7.

Fig. 11 is a sectional view similar to Fig. 6 but on a larger scale, showing a modification of a feature of the invention, and Fig. 12 is a section similar to Fig. 11 illustrating another modification of a feature of the invention.

Referring to Figs. 1 to 10, inclusive, a locomotive designated generally by the letter L is coupled at 10 in the conventional manner to a tender T. The locomotive has a firebox 11 provided with grates 12 and a backhead 13, the backhead having a firing opening 14 therein above the elevation of a cab deck 15 of the locomotive cab 16. The firebox and cab are carried by the frame 17 of the locomotive.

The tender has a fuel bin or bunker 18, a water compartment 19, and a deck 20, the deck extending beneath the fuel bunker. A portion of the water compartment 19 is separated from the remainder thereof by vertically disposed plates 21, 22 and 23 to form a compartment 24 between the bunker 18 and the tender frame 25 for receiving the rear end of a fuel conveyer. Plates 21, 22 extend longitudinally of the tender and form the side walls of compartment 24, and plate 23 extends transversely of the tender and forms the rear end wall of this compartment.

The conveyer comprises, generally speaking, a member or casing M attached to the backhead 13, a rearward conduit section or trough O mounted on the tender in compartment 24, and a forward conduit section N having a ball joint connection 26 with the casing M and a ball joint connection 27 with the trough O.

The casing M serves as a support or frame for a firedoor 28, as one of the supports for the conduit section N, and it is designed to carry the fuel distributing means of the conveyer. This casing is rigidly secured to the backhead by studs 29. It is arranged to surround the firing opening 14 and comprises a top wall 30, a bottom wall 31 and side walls 32, 33. These walls are disposed substantially at right angles to the backhead 13 and form, in effect, continuations of the walls of the firing opening 14, and cooperate with the walls of the firing opening to provide a tunnel affording communication between the firebox chamber and the cab 16 when the firedoor 28 is opened. The bottom wall 31 of casing M is provided with an aperture 34 encircled by a spherical flange 35. This flange is formed on the wall 31 and extends downwardly therefrom, and constitutes one element of the ball and socket joint 26.

A fuel distributing plate 36, which forms a forward continuation of the bottom wall 31, extends forwardly from the aperture 34 in the wall 31 through the firing opening 14 and is secured to the casing M by bolts 37. A distributing head 38, extending through a transverse slot or recess in the rear wall 39 of the casing M, is attached to the casing by a bolt 40. The head 38 is disposed rearward of the aperture 34. Blasts of pressure fluid issue from this distributing head through jet holes 41 in a plane slightly above the top surface of the plate 36 for discharging fuel over the plate onto the firebed on the grates as the fuel is delivered upwardly through the aperture 34 in front of the distributor head by mechanism hereinafter described. The fuel delivered to the casing M does not rise above a horizontal plane through the jet holes 41 and therefore cannot come in contact with the firedoor 28 or spill out of the casing M onto the cab deck 15 when the firedoor is opened. The firedoor 28 closes the opening defined by the rear edges of the top wall 30 and the side walls 32, 33 and the upper edge of the rear wall 39.

The conduit section or trough O opens upwardly to receive fuel from the bunker 18. A spherical flange 42 provided on the front surface of the trough end wall 43 forms one part of the ball and socket joint 27. The forward side of a gear case 44 serves as a closure for the rear end of the trough. Wheels 45, 46 mounted on opposite sides of the trough approximately equidistant from the ends thereof are arranged to turn about a common axis. These wheels rest upon angle irons 47 attached to the side walls 21, 22 of the compartment 24. This supporting arrangement for the trough permits the latter to swing laterally in the compartment 24 about a vertical axis midway between the wheels, and also allows the trough to swing slightly in a vertical plane about the axis of the wheels.

The trough O is provided on its forward end with projections or lugs 48, 49 spaced from each other and depending from the bottom of the trough. Lugs 48, 49 are in engagement respectively with the forward ends of plate springs 50, 51, one of these springs being on each side of the vertical central plane of the tender and trough. The rear ends of the plate springs are attached to a brace 52 secured to the floor 53 of compartment 24. Springs 50, 51 are arranged to exert an equal tension in opposite directions on the outside faces of lugs 48, 49, respectively, and thereby tend to maintain the vertical central plane of the trough in the vertical central plane of the tender, or stated in other words, these springs tend to prevent lateral swinging movement of the trough. Each spring slides a slight distance on the lug with which it is in contact when the trough moves. The foregoing is the preferred construction of this feature of the invention, but if desired, one plate spring extending between a pair of lugs on the trough can be employed to accomplish the same purpose.

To prevent loss of fuel between the tender deck 20 and the trough, a sealing frame 54, rectangular in shape and formed of angle irons, is held in contact with the underside of the tender deck by brackets 55 and rollers 56, and is arranged to extend downwardly into the trough to move in a horizontal plane therewith.

The tubular conduit section N has a forward portion 57 curved upwardly from a straight rearward portion 58. A ball element 59 formed on the upper end of the conduit section N and a ball element 60 provided on the rear end thereof are received by spherical flanges 35 and 42, respectively, whereby the conduit section N is vertically supported at one end on the locomotive and at its other end on the tender. Conduit sections N and O are attached together and connected in end to end relation by ball joint 27. The spherical flange 42 has an upper lip 61 and a lower lip 62 extending over and under, respectively, the rear end of the straight portion 58 of the conduit section N to prevent angular movement between the conduit sections N and O in a vertical plane. The conduit section N being connected by ball joint 26 to the casing M, and the trough O being mounted in the tender to swing slightly in a vertical plane about the axis of the wheels 45, 46, allows the conduit sections N and O to rock together in a vertical plane to facilitate vertical movement of the locomotive with respect to the tender when the vehicles operate over turn-tables and cross-overs.

Conduit section N opens upwardly into and communicates directly with the casing M, the ball and socket joint 26 therebetween being wholly above the cab deck 15. The upper end of conduit section N terminates outside the firebox, substantially in a horizontal plane through the lower marginal edge of the firing opening 14, and between the disturbing plate 36 and head 38.

To prevent the weight of the fuel conveyer from distorting the backhead sheets or imposing undue strains thereon, it is desirable to further support the conduit section N on the lower end of the backhead 13 in proximity to the mudring 63. A cup-shaped element 64 formed on the curved portion of conduit section N receives one end of a coil spring 65, and a similarly shaped element 66 in telescopic relation with the element 64 receives the other end of the spring and is arranged to slide slightly on the top surface 67 of a bracket 68 when the conduit section N moves. This bracket is rigidly attached to the lower end of the backhead. The coil spring 65 is disposed in a transverse plane through the center of ball joint 26, and the top surface 67 of the bracket is concentric with the spherical surface of ball element 59.

Fuel transfer means in the conveyer consists of a helical screw 69 within the conduit section N and a helical screw 70 in the trough O. These helical screws are connected by a universal joint 71 at the center of ball joint 27. Screw 69 terminates at its forward end at the bend in the forward conduit section. Helical screw 70 is operatively connected to a drive shaft 72 by means of power transmitting mechanism in gear case 44. Drive shaft 72 extends along the side of the conveyer and is connected at its forward end to a driving motor (not shown).

Arms 73, 74 extend outwardly on opposite sides of the rear end of conduit section N adjacent ball joint 27. These arms are provided on their outer ends with adjustable set screws 75 arranged to contact lugs 76, 77 formed on opposite sides of the spherical flange 42 of the trough, for limiting the lateral swing or angular movement of the conduit section N with respect to the trough O in opposite directions. The set screws 75 may be adjusted so that the conduit section N can swing laterally from the central vertical plane of the trough either the same or a greater distance in one direction than in the opposite direction. Predetermining and limiting the angular movement between the conduit sections by means of adjustable set screws 75 also limits the maximum angle imposed on the universal joint 71 between the helical screws 69 and 70 when the locomotive and tender negotiate sharp curves.

In operation, fuel falls from the bunker 18 through an opening 78 in the tender deck 20 into the trough O. The position of opening 78 may be varied by slide plates 79 as the bunker becomes depleted. The fuel is conveyed through the trough by helical screw 70 and through the straight rearward portion 58 of the tubular conduit section N by the helical screw 69, and it is forced from the front end of screw 69 through the upturned forward portion 57 of the conduit section N into the casing M. The blasts of pressure fluid which issue from jet holes 41 in the distributing head 39 discharge fuel from the top of the upwardly advanced column of fuel into the firebox.

When the locomotive and tender operate around slight curves or travel over tracks of a degree of curvature within a predetermined range, the conduit section N swings laterally with respect to both vehicles and the trough to facilitate lateral displacement between the rear end of the locomotive and the forward end of the tender (Fig. 7), the plate springs 50, 51 preventing such movement between the trough O and the tender. When the vehicles operate around sharp curves or pass over tracks of a degree of curvature greater than the predetermined range, the conduit section N will swing laterally alone until one of the set screws 75 comes in contact with one of the lugs 76, 77 on the trough. Further angular movement between the conduit section N and the trough O is then prevented, and the conduit section N and the trough will swing laterally together to permit further lateral displacement between the tender and locomotive (Fig. 8), the tension of plate springs 50, 51 being overcome by the action of the conduit section N to swing the trough. The vertical central plane of the trough will then become angularly disposed with the vertical central plane of the tender.

By way of example, assume that the sharpest curve the vehicles negotiate is one of twenty degrees, and it is desirable that the trough O swings laterally with relation to the tender when the vehicles operate over tracks of a degree of curvature greater than ten degrees. The angle between the vertical central plane of the conduit section N and the vertical central plane of the trough when the vehicles are on tracks of a curvature of ten degrees is determined by a layout, and the set screws 75 adjusted to allow the conduit section N to swing to each side of the vertical central plane of the trough at the computed angle. When the vehicles travel over tracks of a degree of curvature greater than ten degrees, the conduit section N will swing laterally alone until the curvature of the tracks becomes ten degrees, when one of the set screws 75 will contact one of the lugs 76, 77. Swinging movement between the conduit section N and the trough O is then prevented, and as the curvature of the tracks exceeds ten degrees the conduit section N and the trough will swing laterally together to facilitate further lateral displacement between the rear end of the locomotive and the forward end of the tender. When the vehicles move back onto straight tracks the reverse action occurs. Since the trough O swings laterally to facilitate only a portion of the displacement between the vehicles, a trough receiving compartment 24 of comparatively narrow width may be provided.

Figs. 11 and 12 illustrate modified forms of the means for preventing lateral swinging movement of the trough when angular movement between the conduit section N and the trough is not prevented by one of the set screws 75. In Fig. 11 a lug 85 on the trough extends downwardly between a pair of coil springs 86, 87 mounted within a housing 88 secured to the floor 53 of the trough receiving compartment. In Fig. 12 a coil spring 90 is interposed between the trough and the side wall 21 of the trough receiving compartment, and a coil spring 91 interposed between the compartment side wall 22 and the trough.

It is to be understood that the invention is not limited to the particular constructions shown and described, and that changes in design of the separate parts and various arrangements of the different elements may be made without departing from the spirit and scope of the invention.

I claim:

1. In combination with an intercoupled locomotive and tender, a conduit section mounted on one of said vehicles to swing laterally with respect thereto, means tending to prevent such movement of said conduit section, a conduit section flexibly jointed at one end to the first-named section and supported at its other end on the other vehicle, and a stop element on one of said conduit sections arranged to contact the other section for limiting angular movement between the conduit sections.

2. In combination with an intercoupled locomotive and tender, a conduit section mounted on one of said vehicles to swing laterally with respect thereto, resilient means tending to prevent such movement of said conduit section, a conduit section flexibly jointed at one end to the first-named section and supported at its other end on the other vehicle, and a stop element on one of said conduit sections arranged to contact the other section for limiting angular movement between the conduit sections.

3. In combination with an intercoupled locomotive and tender, the tender having a conveyer receiving compartment provided with a floor, a conduit section mounted on the tender to swing laterally with respect thereto, means on the floor of said compartment tending to prevent such movement of said conduit section, and a conduit section flexibly jointed at one end to the first-named section and supported at its other end on the locomotive.

4. In combination with an intercoupled locomotive and tender, the tender having a conveyer receiving compartment provided with side walls, a conduit section mounted on the tender to swing laterally with respect thereto, means on each of the side walls of said compartment cooperating to tend to prevent such movement of said conduit section, and a conduit section flexibly jointed at one end to the first-named section and supported at its other end on the locomotive.

5. In combination with an intercoupled locomotive and tender, a conduit section mounted on one of said vehicles to swing laterally with respect thereto, means on each side of the vertical central plane of said conduit section cooperating to tend to prevent such movement thereof, a conduit section flexibly jointed at one end to the first-named section and supported at its other end on the other vehicle, and a stop element on one of said conduit sections arranged to contact the other section for limiting angular movement between the conduit sections.

6. In combination with an intercoupled locomotive and tender, a conduit section mounted on one of said vehicles to swing laterally with respect thereto, a conduit section flexibly jointed at one end to the first-named section and supported at its other end on the other vehicle, a pair of stop elements for limiting angular movement of one of said conduit sections with respect to the other section in opposite directions, and means for preventing lateral swinging movement of the first-named section with respect to the vehicle upon which it is mounted when one of said stop elements is not functioning to limit angular movement between the conduit sections.

7. In combination with an intercoupled locomotive and tender, a conduit section mounted on one of said vehicles to swing laterally with respect thereto, a conduit section flexibly jointed at one end to the first-named section and supported at its other end on the other vehicle, means for limiting angular movement of one of said conduit sections with respect to the other section, and a pair of resilient members cooperating to prevent lateral swinging movement of the first-named section with respect to the vehicle upon which it is mounted when said means is not functioning to limit angular movement between the conduit sections.

8. In combination with an intercoupled locomotive and tender, a conduit section mounted on one of said vehicles to swing laterally with respect thereto, a conduit section flexibly jointed at one end to the first-named section and supported at its other end on the other vehicle and mounted to swing laterally with respect to the last-named vehicle, means tending to prevent lateral swinging movement of one of said conduit sections with respect to the vehicle upon which it is mounted, and means on one of said conduit sections arranged to engage the other section for limiting angular movement between the conduit sections, one of said conduit sections being arranged to facilitate maximum lateral displacement between the adjacent ends of the vehicles, and the other conduit section being arranged to facilitate only a portion of said displacement.

9. In combination with an intercoupled locomotive and tender, a conduit section mounted on one of said vehicles to swing laterally with respect thereto, a conduit section flexibly jointed at one end to the first-named section and supported at its other end on the other vehicle and mounted to swing laterally with respect to the last-named vehicle, means tending to prevent lateral swinging movement of one of said conduit sections with respect to the vehicle upon which it is mounted, a helical screw section within each of said conduit sections universally connected together at the flexible joint between the conduit sections, and means on one of said conduit sections arranged to engage the other section for limiting angular movement between the conduit sections, one of said conduit sections being arranged to facilitate maximum lateral displacement between the adjacent ends of the vehicles, and the other conduit section being arranged to facilitate only a portion of said displacement.

10. In combination with an intercoupled locomotive and tender, a conduit section mounted on one of said vehicles to swing laterally with respect thereto, a conduit section flexibly jointed at one end to the first-named section and supported at its other end on the other vehicle and mounted to swing laterally with respect to the last-named vehicle, means tending to prevent lateral swinging movement of one of said conduit sections with respect to the vehicle upon which it is mounted, a helical screw section within each of said conduit sections universally connected together at the flexible joint between the conduit sections, and a pair of stop elements for limiting angular movement of one conduit section with respect to the other conduit section in opposite directions, thereby limiting the maximum angle imposed on the universal connection between the helical screw sections, each of said stop elements being carried by one of said conduit sections and arranged to engage the other section.

11. In combination with an intercoupled locomotive and tender, a conduit section mounted on the tender to swing laterally with respect thereto, means tending to prevent such movement of said conduit section, a conduit section flexibly jointed at one end to the first-named section and supported at its other end on the locomotive, and means on one of said conduit sections arranged to contact the other section for limiting angular movement between the conduit sections.

12. In combination with an intercoupled locomotive and tender, a conduit section mounted on the tender to swing laterally with respect thereto, a conduit section flexibly jointed at one end to the first-named section and supported at its other end on the locomotive, means for limiting angular movement of one of said conduit sections with respect to the other section, and means for preventing lateral swinging movement of the first-named section when the first-named means is not functioning to limit angular movement between said conduit sections.

13. In combination with an intercoupled locomotive and tender, a conduit section mounted on the tender to swing laterally with respect thereto, a conduit section flexibly jointed at one end to the first-named section and supported at its other end on the locomotive, means at each side of said flexible joint for limiting angular movement of one of said conduit sections with respect to the other section in opposite directions, and means for preventing lateral swinging movement of the first-named section when one of the first-named means is not functioning to limit angular movement between said conduit sections.

14. In combination with an intercoupled locomotive and tender, a conduit section mounted on the tender to swing laterally with respect thereto, a conduit section flexibly jointed at one end to the first-named section and supported at its other end on the locomotive, means for limiting angular movement of one of said conduit sections with respect to the other section, and means at each side of the vertical central plane of the first-named section cooperating to prevent lateral swinging movement thereof when the first-named means is not functioning to limit angular movement between said conduit sections.

15. In combination with an intercoupled locomotive and tender, a conduit section mounted on the tender to swing laterally with respect thereto, a conduit section flexibly jointed at one end to the first-named section and supported at its other end on the locomotive, means on one of said conduit sections arranged to contact the other section for limiting angular movement of one conduit section with respect to the other section, and means for preventing lateral swinging movement of the first-named section when the first-named means is not functioning to limit angular movement between said conduit sections, whereby the second-named section swings laterally alone when the adjacent ends of the locomotive and tender move laterally with respect to one another in negotiating tracks of a degree of curvature within a predetermined range, and both said conduit sections swing laterally together when the adjacent ends of the locomotive and tender are further displaced laterally with respect to one another in negotiating tracks of a degree of curvature greater than said predetermined range.

16. In an intercoupled locomotive and tender, a conduit section mounted on one of said vehicles and arranged to swing laterally with respect thereto, a conduit section flexibly jointed at one end to the first-named section and supported at its other end on the other vehicle, the second-named section arranged to swing laterally with respect to the last-named vehicle, each of said conduit sections being arranged to swing slightly in a vertical plane, and said flexible joint being formed to prevent angular movement between the conduit sections in a vertical plane.

17. In an intercoupled locomotive and tender, a conduit section mounted on one of said vehicles and arranged to swing laterally with respect thereto, a conduit section flexibly jointed at one end to the first-named section and supported at its other end on the other vehicle, the second-named section arranged to swing angularly in a horizontal plane with respect to the first-named section, and means for preventing angular movement between the conduit sections in a vertical plane.

18. In an intercoupled locomotive and tender, a tubular conveyer conduit section having a ball and socket joint at its delivery end with a conveyer member on the locomotive and a ball and socket joint at its receiving end with a conduit section on the tender whereby the first-named section is vertically supported on both vehicles, the first-named section at one end being bent, and additional means for supporting the first-named section at the bend therein and intermediate said ball and socket joints, said additional supporting means lying in a vertical transverse plane through one of said joints.

19. In combination with an intercoupled locomotive and tender, a conduit section mounted on one of said vehicles to swing laterally with respect thereto, a conduit section flexibly jointed at one end to the first-named section and supported at its other end on the other vehicle, means for limiting angular movement of one of said conduit sections with respect to the other section, and means for preventing lateral swinging movement of the first-named section with respect to the vehicle upon which it is mounted when the first-named means is not functioning to limit angular movement between said conduit sections.

20. In an intercoupled locomotive and tender, a bent conveyer conduit flexibly connected at its delivery end to the backhead of the locomotive and having its receiving end mounted on the tender whereby the conduit is vertically supported on both vehicles, a bracket secured to the lower part of the backhead beneath said flexible connection, and additional means for supporting said conduit on the locomotive including a resilient member interposed between said bracket and conduit at the bend in the latter.

HENRY E. LIPPERT.